United States Patent [19]

Garrett

[11] Patent Number: 5,492,556
[45] Date of Patent: Feb. 20, 1996

[54] LIQUID-GAS CONTACTING PUMP DRIVE APPARATUS AND METHOD

[75] Inventor: Richard H. Garrett, Houston, Tex.

[73] Assignee: Rotor-Tech, Inc., Houston, Tex.

[21] Appl. No.: 326,744

[22] Filed: Oct. 25, 1994

Related U.S. Application Data

[63] Continuation-in-part of Ser. No. 152,035, Nov. 12, 1993, abandoned.

[51] Int. Cl.$^6$ ................................................. B01D 53/14
[52] U.S. Cl. ........................... 95/193; 55/229; 55/421; 91/164; 91/321; 95/16; 95/194; 95/231; 96/181; 417/404
[58] Field of Search ........................... 55/227, 228, 229, 55/338, 421; 91/164, 313, 321; 95/14, 16, 23, 188, 193, 194, 206, 231, 237; 96/181; 417/404

[56] References Cited

U.S. PATENT DOCUMENTS

| | | |
|---|---|---|
| 2,990,910 | 7/1961 | Kimmell . |
| 4,375,977 | 3/1983 | Honerkamp et al. ............... 55/256 |
| 4,427,420 | 1/1984 | Reid ..................................... 55/228 |
| 4,431,433 | 2/1984 | Gerlach ............................... 95/231 |
| 4,511,378 | 4/1985 | Greene ................................ 55/228 |
| 4,659,344 | 4/1987 | Gerlach ............................... 95/231 |
| 4,674,446 | 6/1987 | Padilla, Sr. ......................... 95/194 |
| 4,676,806 | 6/1987 | Dean ................................... 95/188 |
| 4,753,664 | 6/1988 | Honerkamp et al. ............... 95/194 |
| 5,167,675 | 12/1992 | Rhodes .............................. 95/231 |

Primary Examiner—C. Scott Bushey
Attorney, Agent, or Firm—Bush, Moseley, Riddle & Jackson

[57] ABSTRACT

A method and apparatus for powering a fluid pump (P) for circulation of a regenerated liquid absorber from a treating vessel or regenerator (R) to a liquid/gas contacting vessel (T) where the liquid absorber removes a predetermined component from a gas. The fluid pump (P) is driven by a shaft from fluid motor (M) and an auxiliary electric motor (E, E-1) assisting the fluid motor (M). The fluid pump (P) receives the entire output of regenerated liquid absorber from the regenerator (R) for pumping the regenerated liquid absorber to the contacting vessel (T). A bypass fluid conduit (49, 48) is utilized for initial circulation of glycol during the start up operation. A glycol measuring device (42) is effective for removing trapped air in conduits (18, 15) between the reboiler (R) and the contactor (T), and in bypass conduits (48, 49) in addition to measuring the flow rate for the liquid absorber.

48 Claims, 5 Drawing Sheets

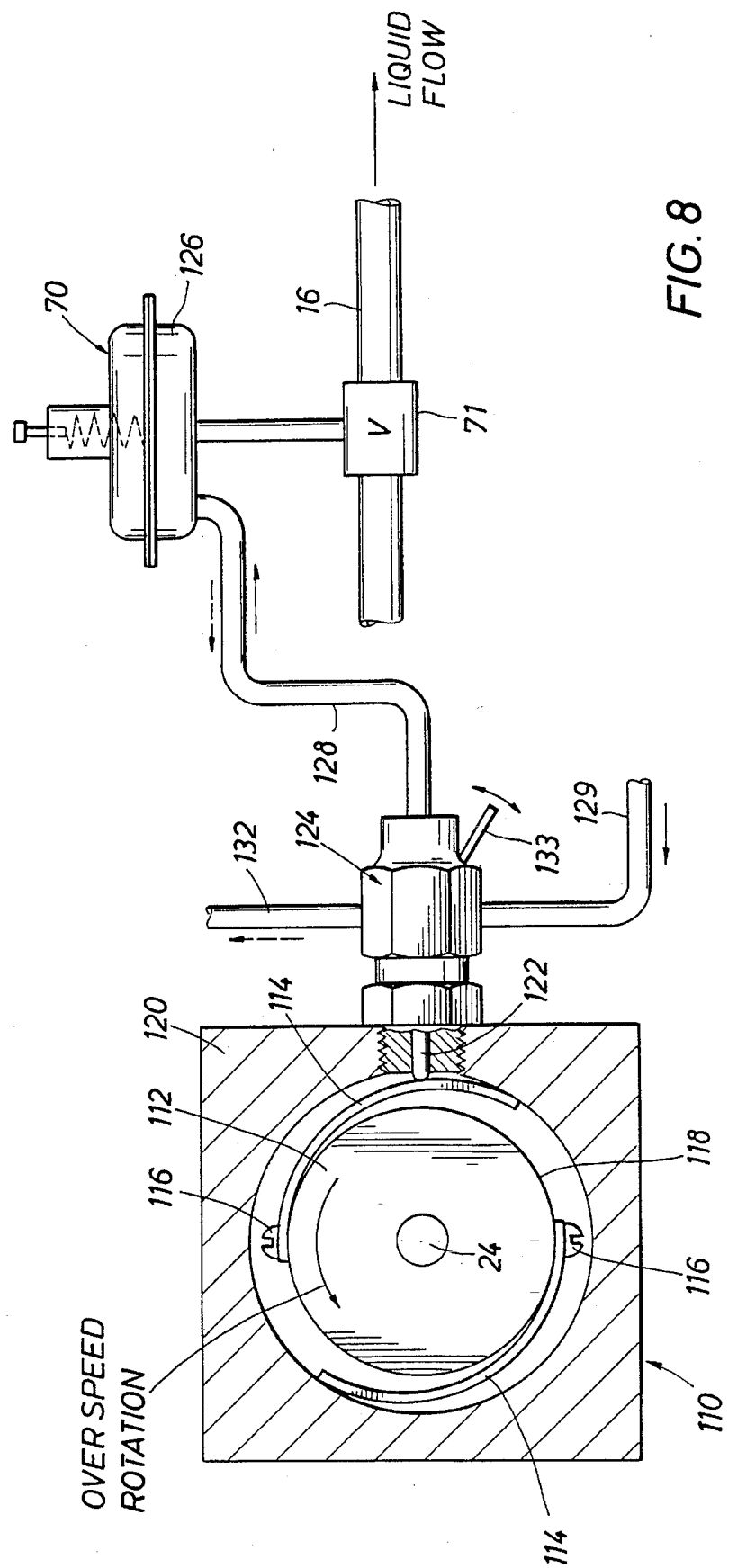

LIQUID-GAS CONTACTING PUMP DRIVE APPARATUS AND METHOD

CROSS REFERENCE TO RELATED APPLICATION

This application is a continuation in part of application Se. No. 08/152,035 filed Nov. 12, 1993, now abandoned, and entitled "Liquid-Gas Contacting Pump Drive Apparatus".

BACKGROUND OF THE INVENTION

1. Field Of The Invention

This invention relates to a method and apparatus for powering a pump for recirculation of a regenerated fluid, and more particularly to such a method and apparatus in which the recirculated fluid is utilized to provide at least a portion of the energy requirements for powering the pump.

2. Prior Art

A gas-liquid contactor vessel is commonly utilized for removing desirable or undesirable elements or components from gas mixtures such as removing water vapor from natural gas by contact of the natural gas with a liquid absorber. Gas-liquid contactor vessels may also be used in amine-type sour gas treating, absorption type hydrocarbon liquid recovery plants, and other processes. An amine type treater removes hydrogen sulfide and carbon dioxide from natural gas. A circulating amine solvent may be utilized as the circulating fluid to remove sulfur compounds from the gas stream.

For the removal of water vapor from flowing natural gas, it is desirable to remove the water or water vapor from the natural gas before the gas flows into a gas transmission line. It has been found that polyethylene glycol (commonly triethylene glycol) effectively removes moisture from natural gas when placed in intimate contact with the gas. This is generally done in a pressure (contactor) vessel operating at substantially the flowing pressure of the natural gas, but this requires that the glycol which is recycled from the contactor through a reboiler be injected into the contactor at a pressure slightly higher than the pressure of the natural gas flowing in the contactor.

Heretofore it has been the practice to use the driving force of the moisture laden rich glycol to operate a fluid motor and associated pump for pumping regenerated lean glycol back into the pressurized contacting vessel. For example, U.S. Pat. No. 4,511,378 shows an energy exchange apparatus wherein a gear motor is driven by wet glycol and gas to operate a gear pump for pumping regenerated dry glycol. In this apparatus, the volume displacement of the gear motor is sufficiently greater than the volume displacement of the gear pump so as to provide adequate power to overcome friction, head, piping and other losses in the system in addition to powering the pump.

Another example is found in U.S. Pat. No. 4,427,420 in which an electric motor drives a separate pump for providing supplemental glycol circulation from the reboiler to the pressurized contacting vessel. Each of these arrangements has its particular drawbacks; in the wet glycol of the '378 patent, the motor volume must be greater than the pump volume and the extra volume of the motor means that gas is used and must be expelled to the atmosphere or reclaimed by a low pressure gathering system and recompressed. Some of this gas can be burned in the reboiler, but most users prefer not to burn wet gas in the reboiler because it corrodes the burner elements, fouls the fire tubes, and is not at all reliable due to entrained liquids.

The system utilized in the '420 patent utilizes two separate pumps independent of each other with each pump receiving only a portion of the dry glycol from the regenerator. One of the pumps is driven by a fluid motor and the other pump is driven by an electric motor to maintain volumetric balance in the system. While the '420 patent does not vent natural gas to atmosphere, many of the recirculating systems being used vent a significant portion of natural gas to the atmosphere which results in environmental degradation as well as wasting valuable energy in the flared gas. Also, the '420 patent must pump all the volume required by the reciprocating piston pump due to its imbalance. This volume must be supplied at contactor pressure so an inordinate amount of electric power must be used.

The present invention provides a new and improved apparatus and method which retains the principal benefits of the earlier energy exchange unit by recovering substantial energy from the system by using as much of the energy as is available from a given volume of liquid in the system before the liquid pressure is reduced to near atmosphere pressure of the reboiler to drive a recirculating pump. It avoids the disadvantages of the earlier system described above in the '420 patent which requires a separate electric motor and separate pump to complement the energy exchange drive powered only by the recirculating liquid. The only electric power required in the present invention is to overcome the slight friction encountered in the pump—motor friction and associated hydraulic friction in the piping. Aside from the obvious environmental advantage of reducing emissions, the present invention also avoids the economic waste inherent in a system that vents gas into the atmosphere because that cost, at present day gas prices, far exceeds the cost of electricity required to operate a small electric motor.

An object of the present invention is to provide a method and apparatus for the removal of selected elements from a gas mixture by providing a pump for recirculation of a removal fluid through a gas-liquid contactor vessel.

A further object of the present invention is to provide such a method and apparatus for the removal of selected elements from natural gas while utilizing the recirculating removal fluid to maximize the energy requirements for powering a pump to pump the regenerated removal fluid into the gas-liquid contactor vessel.

An additional object is to provide an auxiliary drive means operably connected to the pump to supplement adequately the power provided to the pump from a fluid motor driven by the removal fluid.

SUMMARY OF THE INVENTION

The present invention is a method and apparatus in an improved recirculating pumping system for recirculating a removal liquid such as glycol, in a liquid-gas contactor apparatus, i.e. using liquid pressure to power a motor to drive a recirculating pump, but with the added advantage of supplementing the power preferably with a relatively small electric drive motor coupled to the same recirculating pump shaft to add enough additional energy to offset or overcome internal friction and/or inefficiencies of the primary pumping system, thus eliminating the necessity of either a separate electric motor and pump or the necessity of expending significant amounts of gas to successfully operate the recirculating pump system.

Thus, this new invention combines the power conserving advantages of the energy exchange pump with the advantages of auxiliary electrical power without the disadvantages associated with having two separate pumps and their associated piping and without using any free gas. "Free gas+ as opposed to "absorbed gas+ does not penetrate the inner structure of a liquid such as glycol, whereas "absorbed gas+ which includes water vapor penetrates the inner structure of glycol or other liquid absorber. The free gas for a natural gas dehydrator is natural gas.

This new pumping system preferably comprises an energy exchange device using a hydraulic motor and pump, each having essentially the same volume, with an additional electric motor providing just enough additional power to offset the hydraulic motor-pump friction, head and hydraulic loss, and/or imbalance, if any, to allow the device to rotate at the synchronous electric motor speed. Further, in the event a speed control is used for varying the flow by controlling the electric motor speed, a motor speed controller for a small supplemental motor is correspondingly smaller and considerably less expensive than a speed controller for a larger electric motor.

The present invention is particularly directed to a rotary fluid motor and a rotary fluid pump having a drive shaft extending between the rotary pump and motor. A separate auxiliary drive means, preferably an electric motor, is operably connected to the drive shaft to supplement the power provided by the fluid motor.

BRIEF DESCRIPTION OF THE DRAWINGS

FIG. 8 is a schematic of a modification for stopping the fluid pump in the event of overspeeding of the fluid motor.

DETAILED DESCRIPTION

Figure 1:
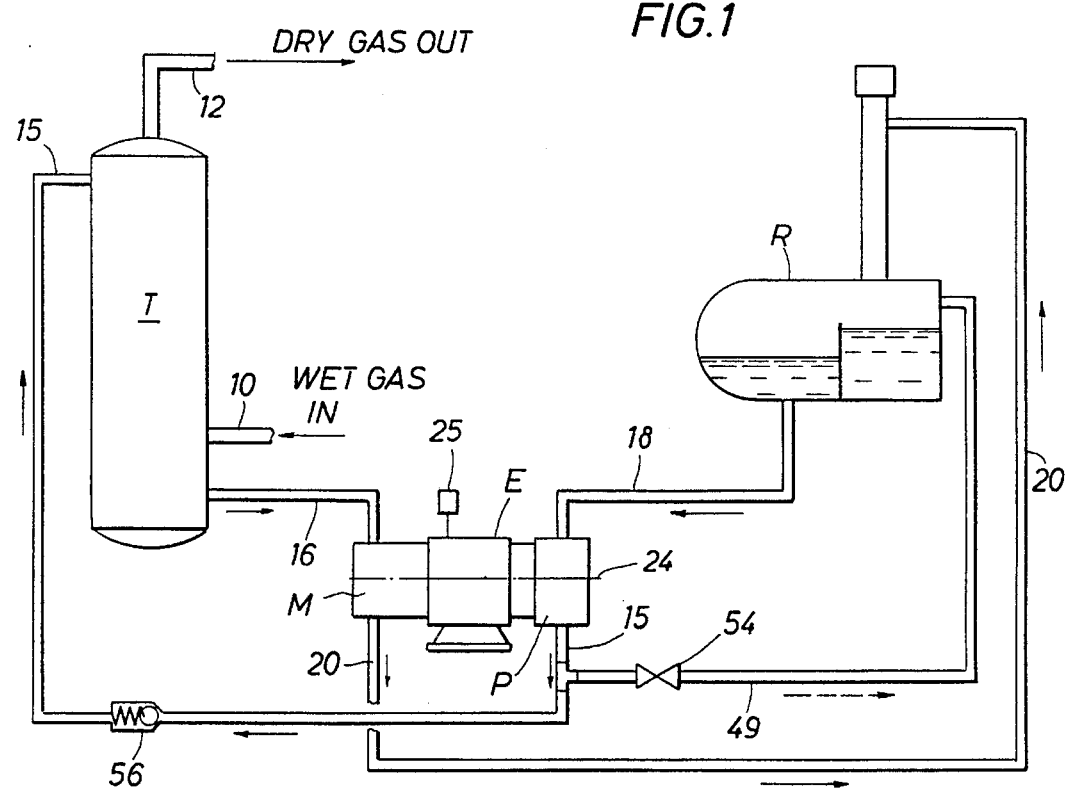
FIG. 1 is a schematic flow diagram of the method and apparatus of the present invention.

Shown in FIG. 1 of the drawings is a schematic view of a typical glycol dehydrator system which is illustrative of a system in which the pumping apparatus of the present invention is used. The contactor T has fluid connections 10 through which wet gas from a producing gas well or other source is introduced into the contactor and an outlet pipe 12 through which dehydrated gas flows, i.e. gas from which moisture has been removed by circulating glycol is discharged from the contactor. The glycol is introduced into the top of the contactor T via inlet 15 and after passing through the contactor in intimate contact with the raw wet gas is removed through outlet 16 near the bottom of the contactor. The outlet 16 passes the moisture laden glycol to a hydraulic motor M at high pressure and a discharge conduit 20 carries glycol at low pressure from motor M to the reboiler R where gas and moisture are boiled off in a conventional manner at or near atmospheric pressure. Regenerated glycol is then carried from the reboiler R to the inlet of the pump P via conduit 18 and pumped back into the contactor T at high pressure through inlet 15.

The pump P and the motor M are near equal in volume and are mounted on a shaft 24 which, in the preferred embodiment, extends through the electric motor E. The electric motor E, which may include a speed control 25, is large enough to provide the small amount of power required to overcome internal friction and other inefficiencies in the pumping system, piping, controls, etc. Such a small electric motor and speed control 25 are relatively inexpensive to install and operate. Also, in the event a liquid level control is desired, it need be only a small controller that is compatible with the near equal volume of liquid passing through the hydraulic pump and motor. A bypass line 49 is connected between pump P and reboiler R and a bypass valve 54 is provided in line 49 to permit unloading of pump P. When bypass valve 54 is open, fluid motor M may by used to start rotation of pump P with glycol being returned to reboiler R from pump P through line 49 and valve 54. When electric motor E is energized, bypass valve 54 should be closed to allow all of the glycol flow to return to contactor T through line 15 and check valve 56.

Figure 2:
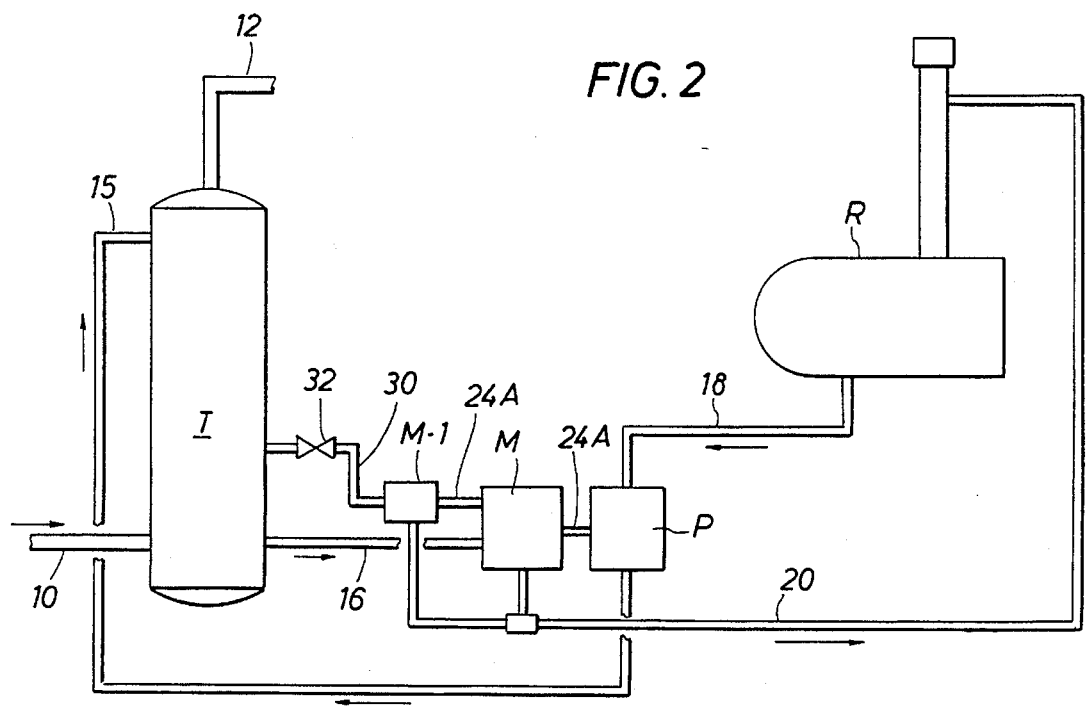
FIG. 2 is a schematic view of an alternative flow diagram with an alternative pump drive apparatus.

A modified system of the present invention as shown in FIG. 2, includes the primary hydraulic motor M and pump P which are mounted on offset shaft portions 24A connected to each other by suitable gear connections (not shown). Additionally, a secondary fluid motor M-1 provides an auxiliary drive to the primary motor M. The auxiliary motor M-1 is connected to the contactor T by a small supply line 30 for supplying fluid (liquid and gas) to drive the motor M-1. In this embodiment the primary motor M is supplied motive fluid through the primary conduit 16. There is preferably no throttle in the supply conduit 16 that feeds the motor M, however there is a throttle control 32 in the smaller line 30 providing control means to adjust the amount of fluid flowing to the auxiliary motor M-1 and thus the amount of supplemental power provided to the primary motor M. This arrangement allows the primary motor M to run substantially totally on liquid and avoid the losses associated with use of excess gas. The throttle valve 32 provides a means to control the speed of the motor M by varying the flow through auxiliary motor M-1 and thus the flow rate output of the pump P. Supply line 30 also controls the liquid level in contactor T without a separate level control.

Figure 3:
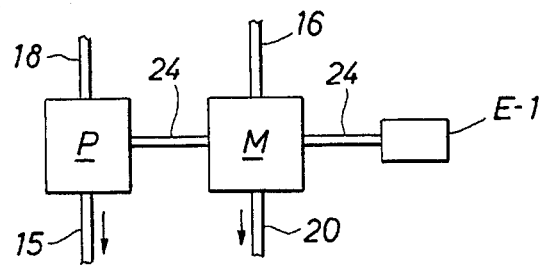
FIG. 3 is a schematic view of another alterative pump drive apparatus.
Figure 4:
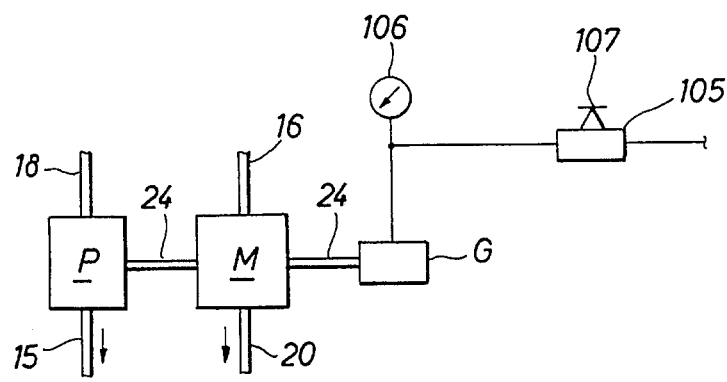
FIG. 4 is a schematic view of a further alternative pump drive apparatus.
Figure 5:
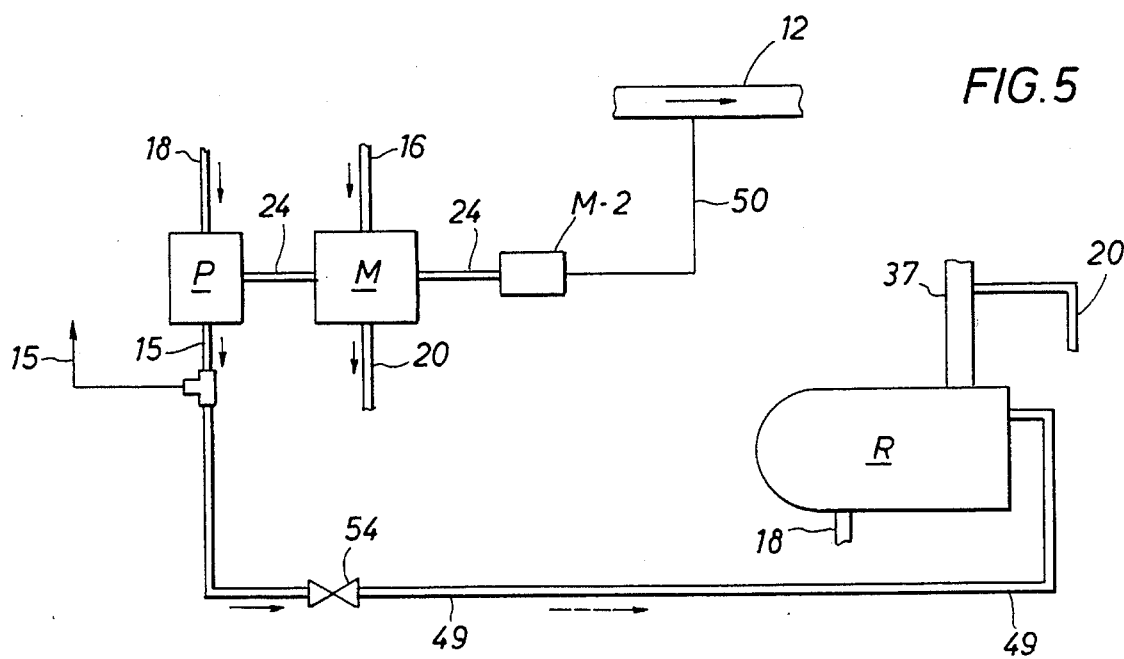
FIG. 5 is a schematic view of a pump drive apparatus using a small internal combustion motor as an auxiliary power source.

With the present invention, in each alternative embodiment shown in FIGS. 3–5, an auxiliary power source is added to an energy exchange unit in which the contactor pressure is used to drive a primary hydraulic motor to power the pump for recirculating the glycol through the gas contacting system. It will be appreciated that a variety of auxiliary power sources can be employed to accomplish the purpose and requirements of the present invention, all within the scope of this invention as described in the appended claims. Moreover, with the various embodiments shown herein, the additional auxiliary power can be applied as required by retrofitting supplemental energy sources to a preexisting drive motor and derive the full benefits of this invention. Particularly in the instance where the entire apparatus is constructed as a new unit, the present invention affords the additional advantage of eliminating the use of the extra piping and controls which are required in some of the prior art devices and is applicable to a gear motor/pump device as well as to a piston type energy exchange pump.

As shown in FIG. 3 of the drawings, the pump P and motor M share a shaft 24 and the auxiliary power source, an electric motor E-1, is mounted on an end of the shaft 24 extending beyond the primary motor M. It will be appreciated that space and mechanical limitations, particularly in retrofit situations may dictate that the auxiliary power source be mounted adjacent either the pump P or motor M, as space allows.

Also, as shown in FIG. 4 of the drawings, an auxiliary gas motor G is shown mounted on one end of the shaft 24, and in this instance, the gas motor is connected to a separate source of low pressure gas (not shown) which is supplied through a pressure regulator 105 from a high pressure dry gas source which has a meter 106 and a throttle valve 107 for adjusting the pressure and flow of the gas to the auxiliary motor.

Another approach is to connect a small gas internal combustion engine M-2 to the shaft 24 as shown in FIG. 5. A bypass line 49 connected between the pump P and reboiler R, which is at or near atmospheric pressure provides a means to dump the pump output and thus unload the pump P. Bypass valve 54 is provided in bypass line 49. With the bypass valve 54 open, the motor M can be used to crank and start the auxiliary engine M-2 as lean glycol from pump P may be circulated at low pressure through reboiler R without passing through the high pressure contactor. Dry gas is piped to the engine M-2 via conduit 50 from a separate source such as dry produced gas from line 12. An adjustable speed control or governor is provided for engine M-2.

Reference numerals in the embodiments of FIGS. 2–5 similar to the reference numerals of the embodiment of FIG. 1 represent similar parts or elements.

Figure 6:
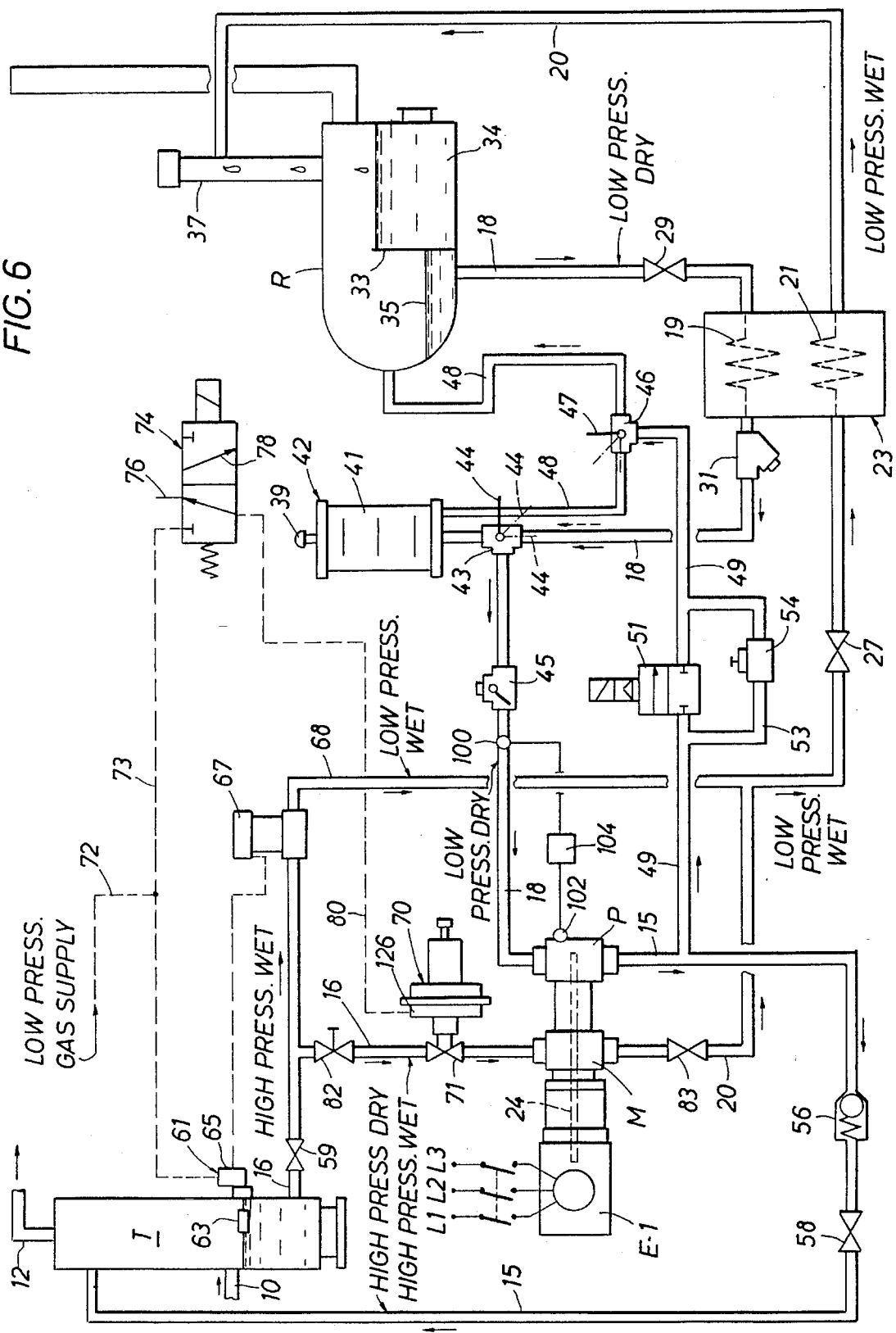
FIG. 6 is a schematic view of a typical system utilizing the present invention and illustrating a glycol dehydration system.

Referring now to FIG. 6, a schematic view of the system for the embodiment shown in FIG. 3 is illustrated in which various controls are provided for a typical glycol dehydrator in which the embodiment of FIG. 3 is utilized. Electric motor E-1 is shown mounted on an end of shaft 24 extending beyond motor M and forms an auxiliary power source for powering pump P. Wet natural gas is introduced within the contactor vessel T through inlet line 10. Dry natural gas is discharged from outlet 12 into a suitable transmission line. High pressure wet glycol from outlet line 16 drives a gear motor M to rotate the shaft 24 for driving a rotary gear pump P. Electric motor E-1 connected to shaft 24 provides a supplemental source of power to rotate shaft 24 for powering pump P. A drop in pressure occurs in the glycol upon exiting motor M and low pressure wet glycol from outlet line 20 is supplied to reboiler or regenerator R. Outlet line 20 has a coil 21 within a heat exchanger 23. Low pressure regenerated dry glycol is supplied from reboiler R through outlet line 18 to pump P. High pressure dry glycol is pumped from pump P through line 15 to contactor vessel T and is discharged within contactor T for absorbing water vapor from the natural gas in contactor T as the liquid glycol moves downwardly through contactor T in intimate contact with the natural gas. Rotary gear pump P and rotary gear motor M are preferably of the type shown in U.S. Pat. No. 4,511,378 but with the volumetric capacity of gear motor M equal to or less than the volumetric capacity of gear pump P.

Outlet line 18 from reboiler R has a coil 19 arranged within heat exchanger 23. Heat exchanger 23 preheats wet glycol in coil 21 and cools dry glycol in coil 19 of low pressure line 18 before entering pump P. A block valve 27 is positioned in low pressure wet glycol line 20 upstream of heat exchanger 23 and block valve 29 is positioned in low pressure dry glycol line 18 upstream of heat exchanger 23. A filter or strainer 31 is provided in line 18 downstream of heat exchanger 23. A relatively small electric motor E-1 may be utilized such as a motor having a horsepower (HP) between around ¼ HP to 30 HP. Generally the output of motor E-1 is around 5% to 40% of the total horsepower required by pump P with the volumetric capacity of motor M and pump P being generally equal. The wet glycol for driving gear motor M has no appreciable gas therein so no appreciable gas is utilized in the driving of gear motor M. For example, a ½ horsepower electric motor may be utilized with an electric power supply of between 1 and 1½ amps. As an example, with pump P pumping five gallons per minute (GPM) at 400 psi with glycol at a temperature of 216F the auxiliary electric motor E-1 was operated with 1.2 amps of electrical power. Under certain conditions, it may be feasible to provide a solar source of energy for operation of the electric motor.

Reboiler R is a low pressure heated vessel and has a partition 33 separating a vessel into a partially wet glycol reboiler tank section 34 and a dry storage tank section 35. The water vapor in wet gas is absorbed in the wet glycol entering from line 20 in heated column 37 and is flashed off or collected by emission control equipment (not shown). Column 37 may be open to atmosphere so that steam can escape, or it may be connected to emission control equipment.

A separate glycol flow measuring device is shown generally at 42 and includes a cylindrical transparent measuring container 41 which acts as a gage to measure the flow rate of glycol. A vent 39 to atmosphere on measuring container 41 acts to vent air to atmosphere from container 41 and has a removable cap. Air in various conduits during priming of pump P is emitted from container 41. A three way diverter valve 43 controls glycol flow from measuring container 41. Diverter valve 43 has a manually actuated handle 44 and low pressure dry glycol from reboiler R is supplied to pump P through line 18 when handle 44 is in the solid line horizontal position shown in FIG. 6. In the broken line vertical position of handle 44 shown in FIG. 6, glycol flows from measuring container 41 into line 18 to pump P. In the 45° degree broken line portion of handle 44, low pressure dry glycol is supplied simultaneously both to container 41 and to pump P from reboiler R.

A connecting bypass line 49 from line 15 has branch lines 48 extending to reboiler R and to glycol measuring container 41. A three way diverter valve 46 has a manually actuated handle 47 for diverting flow through branch lines 48. In the up vertical solid line position shown in FIG. 6 for handle 47, flow is directed to container 41 through one branch line 48. In the down horizontal broken line position of handle 47 shown in FIG. 6, flow is directed to reboiler R from the other branch line 48, and in the 45° broken line position, flow is diverted both to container 41 and reboiler R from bypass line 49. Air in bypass line 49 and branch lines 48 is also removed by vent 39 or column 37 depending on the position of handle 47. A normally closed solenoid operated valve 51 is provided in connecting bypass line 49 and a line 53 bypassing valve 51 has a manually operated valve 54 therein thereby to control flow through bypass lines 49 and 48, to remove air, prime pump P, and relieve back pressure on pump P for ease of start-up.

Graduated indicia is provided on transparent cylindrical container 41 for visually indicating the amount of glycol therein. When container 41 is filled with glycol with handle 44 in a 45° relation, or from valve 54, 46 when pump P is operating, handle 44 is moved to the down vertical position to close line 18 and permits flow from measuring container 41. It may be desired to determine the glycol flow rate while motor M and pump P are in normal running operation and this can be accomplished by actuation of three-way valve 46 and three-way valve 43. With handle 44 of three-way valve 43 in horizontal position for normal operation of motor M and pump P, handle 47 of valve 46 is in the up vertical position and glycol flows from line 15 and bypass line 49 into the graduated measuring container 41 when valve 54 is opened. When the graduated container 41 is filled to a desired level, valve 54 is closed to stop the supply of glycol to container 41. Handle 44 of valve 43 is then moved to the vertical broken line position shown in FIG. 6 and glycol from measuring container 41 then flows into line 18 with the flow of glycol from reboiler R to pump P blocked. Pump P and motor M continue to operate at the same speed and upon the glycol in container 41 reaching the zero (0) graduation, handle 44 is tripped and returned to the up horizontal position to reopen line 18 from reboiler R. The time for depletion of the glycol from measuring container 41 is recorded and the flow rate determined. Thus, a predetermined volume of glycol pumped from measuring container 41 is timed for accurately determining the flow rate.

Initial Start Up Operation

For a start up operation after pump P and motor M have been shut off for an extended period of time, such as several hours or more, handle 44 of valve 43 is positioned at the 45° position and low pressure dry glycol from reboiler R flows to container 41 and to pump P. Air in line 18 is vented from vent 39 of container 41. When container 41 is full, handle 44 is moved to the down position to close line 18. Valve 54 is then opened and any air in line 15 will be vented by reboiler R or container 41 depending on the position of valve 46 which is controlled by manual handle 47. Next, motor M is energized slowly to rotate pump P slowly with low pressure glycol in container 41. Reboiler R constantly heats the glycol therein for flow from line 18 preferably over 380F. When pump P starts, any air in pump P and line 15 will be vented out to vent 39 of container 41 through bypass line 49 and branch line 48. When all air is removed from line 18, 15, 49 and 48 and vented through vent caps 39 of container 41, the rotational speed of motor M may be increased, if desired. Next valve 54 is closed so that the pressure of glycol in line 15 is increased.

Measuring Flow Rate

Flow measuring device 42 may be utilized at any time to measure the flow rate of glycol. For measuring the flow rate of low pressure dry glycol being pumped by pump P through line 18, valve 54 is opened to provide glycol to container 41 until container 41 is filled to a predetermined level such as one (1) gallon while handle 44 is in the up horizontal position. Then, valve 54 is closed. Then handle 44 is moved to the down vertical position with valve 43 blocking fluid flow in line 18 upstream of valve 43. Glycol flows from container 41 into line 18 downstream of valve 43 to pump P. Pump P thus pumps glycol from container 41 until the zero (0) graduation is reached at which time handle 44 is tripped and returned to the up horizontal position to reopen line 18 from reboiler R. The time for depletion of one gallon of glycol from container 41 is recorded and the flow rate determined. Thus, an accurate measurement of the flow rate may be timed and visually observed by a transparent container 41, and with reference to a calibration chart or formula, the flow rate can be determined. It is apparent also that container 41 may be utilized to add any desired additives to the glycol by placing a predetermined amount of a desired additive within container 41 by removal of the vent cap from vent 39.

A normally closed flow switch 45 in line 18 is open when there is sufficient fluid flow to pump P through line 18. If flow of glycol ceases or is less than a predetermined minimum flow, switch 45 closes to stop motors M and E-1 as will be explained further below. Solenoid valve 51 opens during start up and allows circulation of dry glycol from pump P to glycol container 41, or to dry glycol storage tank section 35 in reboiler R depending on the position of valve 46. During normal operation after start up, solenoid valve 51 is closed. Diverter valve 46 is utilized during start up to allow dry glycol from pump P to flow to reboiler R or glycol container 41 when either valve 54 or solenoid operated valve 51 is open.

A check valve 56 is mounted in high pressure dry glycol line 15 from pump P to prevent any high pressure back flow from contactor vessel T to pump P. Check valve 56 is needed particularly during start up. A block valve 58 is positioned in inlet line 15 to contactor T downstream of check valve 56 to block flow from contactor T and to permit testing or replacement of check valve 56. A block valve 59 is provided in outlet line 16 from contactor T.

A liquid level control is shown at 61 including a float 63 connected to a pneumatic pilot 65. A throttle valve 67 is positioned in high pressure wet glycol line 16 and is responsive to pilot valve 65 for opening in response to float 63 to maintain a constant level of wet glycol within contactor T. A low pressure wet glycol branch line 68 extends from throttle valve 67 to line 20 for return to reboiler R. A suitable throttling motor valve is sold under Model No. 1-2220-S14-TGA-12 by Norriseal of Houston, Tex.

A control valve shown generally at 70 in high pressure wet glycol line 16 to gear motor M has a valve member 71 in line 16 responsive to a diaphragm in diaphragm chamber 126 and is held in an open position by the diaphragm under fluid pressure from a low pressure gas source 72. Valve 82 is a start up control needle valve and block valve 83 is an isolation valve provided in lines 16 and 20 on opposed sides of gear motor M. A normally closed solenoid valve 74 as shown in FIG. 6 vents the diaphragm chamber 126 of control valve 70 to atmosphere at 76 to maintain valve 70 closed to block the flow of high pressure wet glycol to motor M. Upon energizing of solenoid valve 74, low pressure gas is supplied from gas supply 72 through passage 78 of solenoid valve 74 to line 80. The low pressure gas supplied to the diaphragm chamber 126 moves valve member 71 of valve 70 to an open position to permit the supply of high pressure wet glycol to motor M through line 16. Valve member 71 is always maintained in an open position during operation of motor M. Upon deenergizing of solenoid valve 74, solenoid valve 74 returns to the position shown in FIG. 6 and fluid from the diaphragm chamber of control valve 70 is exhausted to atmosphere thereby resulting in the movement of valve 70 to closed position blocking the flow of glycol to motor M. A suitable valve 70 is sold under Model No. 1-2220-S14-TGA-12 by Norriseal of Houston, Tex. Low pressure gas is also provided to liquid level control 61 from gas supply 72 through line 73 for maintaining the proper level of glycol in contactor T.

OPERATION

In operation for start up and referring to FIG. 6, block valves 27, 29 and 83 are open and three-way valve 43 has its handle 44 positioned at the 45 degrees intermediate position to permit dry glycol from reboiler R to flow through line 18, heat exchanger 23 and filter 31 to glycol measuring device 42. Any air in heat exchanger 23 and filter 31 will escape from glycol container 41 which is open to atmosphere. Container 41 is filled to about the half-full mark.

Next, handle 44 of three-way valve 43 is moved to a down vertical position to circulate glycol for the start up operation. Handle 47 of three-way valve 46 is then positioned vertically for the supply of glycol through line 48 into the bottom of glycol measuring device 42. Now, valve 58 is opened with pressure from contactor vessel T blocked by check valve 56. Then, valve 54 is opened and if check valve 56 is leaking, liquid from contactor T will flow into glycol measuring device 42 through valve 54, line 53, line 49, and line 48. Thus, a visual observation of glycol measuring device 42 upon opening of valve 58 will indicate if check valve 56 should be replaced or repaired. Next, high pressure blocking valve 59 in line 16 at contactor T is opened with valves 70 and 82 in a closed position.

Figure 7:
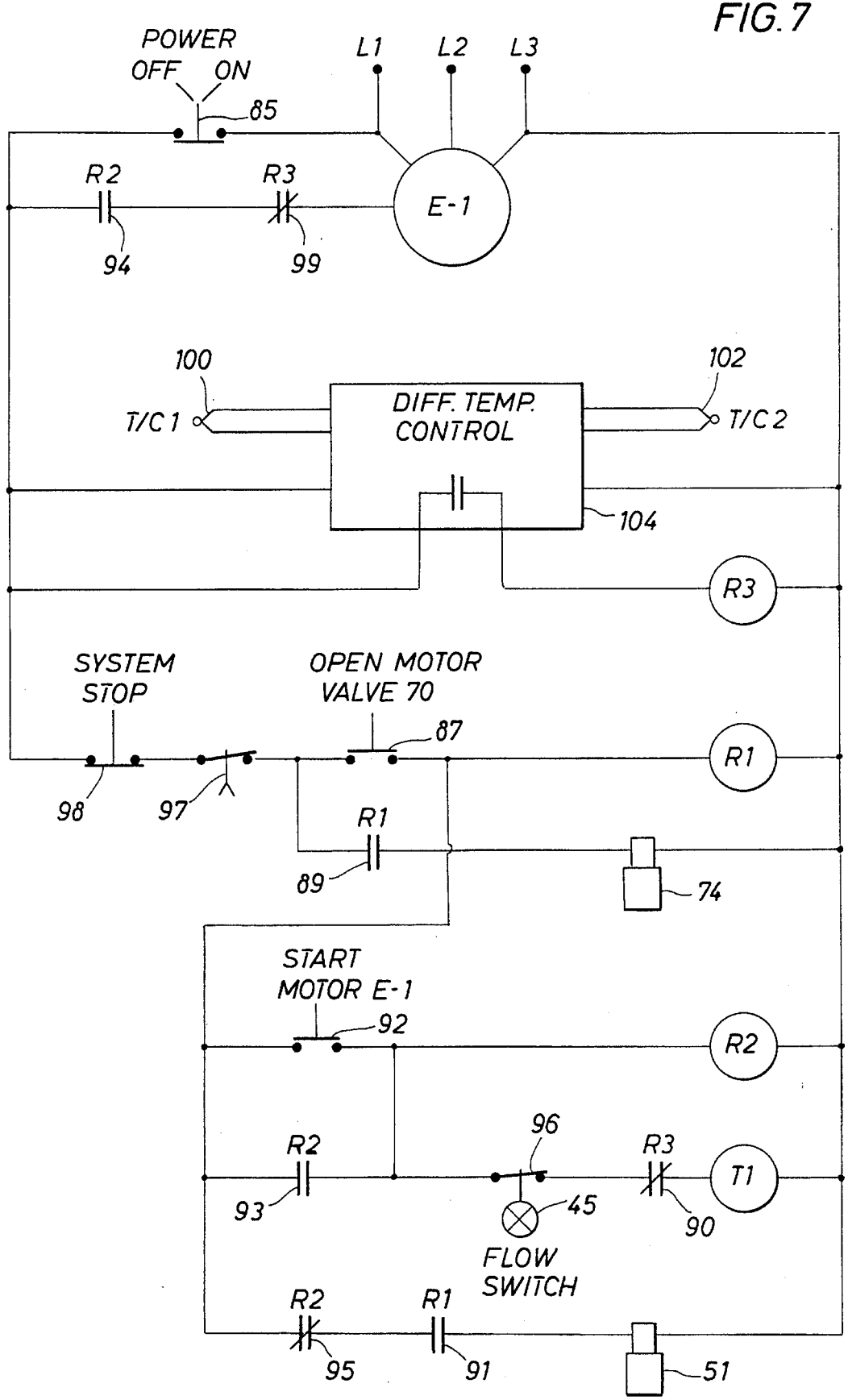
FIG. 7 is a schematic of the electrical circuitry for the system of FIG. 6.

Now, referring also to the electrical circuitry shown schematically in FIG. 7, power switch 85 is moved to an on position to supply electrical power from leads L1 and L3. Push button switch 87 is then closed to energize relay coil R 1 to close contacts at 89 to energize solenoid valve 74. Push button switch 87 may now be released with contacts 89 remaining closed. Energizing of solenoid valve 74 effects supplying low pressure gas from gas supply 72 through passages 73, 78 and line 80 to the diaphragm chamber 126 of motor control valve 70 for opening of valve 71. Contacts 91 of coil R1 are also closed upon energizing of relay R1 thereby to energize solenoid valve 51 for opening of line 49.

High pressure needle valve 82 in line 16 is now manually opened to supply high pressure wet glycol, or gas, or gas and glycol, from contactor vessel T to motor M for slowly rotating pump P and electric motor E-1 on shaft 24. Low pressure glycol from pump P is pumped through open bleed valve 54, open solenoid valve 51, line 53, line 49, and line 48 to glycol container 41 or dry storage tank section 35 depending upon the position of three-way valve 46. Any air in pump P will be purged from container 41 which is open to atmosphere by vent 39. If rotation of pump P does not occur, valve 82 is opened further to provide more power to gear motor M. Bleed valve 54 is closed upon exhaust of all air from line 18, coil 19, filter 31 and flow switch 45 through glycol container 41.

Three-way valve 46 is then moved to a down horizontal position to return dry glycol to reboiler R and three-way valve 43 is moved with handle 44 in a horizontal position for the supply of low pressure glycol to pump P through line 18 from reboiler R. Gear pump P should start heating up as hot dry glycol from reboiler R is supplied to gear pump P through line 18. The gears and gear housing of gear pump P initially may be heated to unequal temperatures resulting in a stoppage of pump P as the hot glycol on the relatively small gears of pump P may heat the gears faster than the larger gear housing. However, a continuous rotation of pump P will occur when the gears and gear housing obtain thermal equilibrium and at this time, electric motor E-1 may be started.

For starting electric motor E-1, push button 92 is pushed to energize relay R2 to close contacts 93 and 94 for energizing electric motor E-1. Normally closed contacts 95 of relay R2 are opened to deenergize solenoid operated valve 51 for movement to its normally closed position blocking line 49. Since contacts 93 are closed, push button 92 can be released. The power supply for electric motor E-1 is preferably a three phase 480 volt system. Under certain conditions, electric motor E-1 may be of a lower or higher voltage, with single phase or DC power applied.

Since solenoid operated valve 51 and bleed valve 54 are closed, the high pressure dry glycol from pump P is blocked from returning to reboiler R or flow measuring device 41 and thereby increases in pressure to open check valve 56 for flow into contactor T. The flow of low pressure dry glycol from reboiler R opens contacts 96 of flow switch 45 to block any signal to timer T1 as shown in FIG. 7. In the event glycol flow in line 18 to pump P stops or is reduced below a predetermined amount, contacts 96 will close to start timer T 1 for a preset time such as 1 to 15 seconds as may be set by an operator. When the preset time is reached, contacts 97 for timer T1 are opened to deenergize solenoid 74 for stopping motors M and E-1 thereby to shut down the system. The short time delay provided by timer T1 permits a small amount of air to be transmitted in line 18 to pump P without shutting down the system. To manually shut down the system at any time, a process stop button 98 may be pushed by the operator.

When a large temperature differential exists between the hot glycol at a temperature of around 225 F., for example, and a relatively cold pump, such as 100 F. for example, the gears of gear pump P being of a low mass may expand rapidly beyond the normal clearance, such as 0.001 inch, between the gears and the relatively high mass gear housing. Possible damage to pump P could result if pump P is operated under such conditions. To prevent operation of motor E-1 when a temperature differential is above a certain amount, such as a temperature differential of over 50 F. for example, a pair of electrically opposed thermocouples 100 and 102 are provided. Thermocouple 100 is immersed in hot glycol in suction line 18 to pump P and thermocouple 102 is positioned in a drilled hole in the metal gear housing. Thermocouples 100 and 102 are connected in parallel opposed relation to each other and to a transducer 104 which provides a signal to deenergize relay R3 to open contacts 99 to stop motor E-1. When motor E-1 is stopped, flow through line 18 to pump P stops. This allows thermocouple 100 to start cooling down and thermocouple 102 begins heating up from the hot glycol that entered the pump P before the temperature differential reached or exceeded 50° F. Thus, with the temperature of thermocouple 100 decreasing and the temperature of thermocouple 102 increasing the temperature differential is reduced. The transducer 104 is programmed to have its internal contacts open when the differential temperature decreases to a safe differential temperature of 35° F. for example. This opening of internal contacts to transducer 104 deenergizes relay roil R3 allowing contacts 99 to close and restart motor E-1. Again, the differential temperature between thermocouples 100 and 102 increases and upon reaching 50° F., motor E-1 will stop and then restart at 35° F. Two, three or more such cycles may be necessary to stabilize the temperature and prevent possible damage to pump P.

It may be desirable under certain conditions to eliminate the differential temperature controller and utilize a second timer (not shown) and a second shut off valve in series with valve 70 installed between valves 82 and 71 (not shown). In this instance, the second timer is set at some predetermined time period, such as 20 seconds, for example.

While a temperature differential transducer 104 and electrical relays have been illustrated, it is understood that a suitable electronic, solid state device may be utilized in place of transducer 104 and the relays responsive to thermocouples 100 and 102 while including a preprogrammed temperature differential for providing a suitable output signal to stop motor E-1 and to restart motor E-1 at a lower temperature differential. Such a solid state device may be encapsulated in resin with screw terminals for thermocouples 100, 102 and separate screw terminals for relay R3 for motor E-1.

It may be desirable under certain conditions to eliminate the timer and utilize a controller responsive to a temperature differential over 50° F., for example, for stopping electric motor E-1 and for restarting electric motor E-1 when the temperature differential is reduced to 35° F. for example. The controller would control the energizing and deenergizing of a solenoid for stopping and starting motor E-1 and could be set for responding to any desired temperature differential. It is noted the deenergizing of electric motor E-1 stops motor M since the volumetric displacement of motor M is substantially equal to or less than the volumetric displacement of pump P.

A relatively large pressure drop occurs between inlet line 16 to motor M and outlet line 20 as gear motor M is driven by the high pressure wet glycol from contactor T. Motor M normally has a volumetric capacity generally equal to or less than the volumetric capacity of pump P so that gear motor M provides a sufficient torque to drive pump P while overcoming mechanical and hydraulic friction with either bypass valve 51 or 54 being open. During some start up operation, there is no glycol in pump P and the high pressure supply of glycol through line 16 to motor M must be controlled so that motor M does not overspeed to result in possible damage to pump P. If pump P runs dry for a very short time, no damage to pump P may occur. However, overspeeding of motor M may occur at speeds of 5,000 rpm or more and damage to pump P at such speeds is likely if the overspeeding occurs for a substantial period of time while pump P is dry. It is desirable to provide a control for such an overspeeding condition.

Referring to FIG. 8, an overspeed device is shown generally at 110 having a generally cylindrical disk or spool 112 mounted on shaft 24 for rotation therewith. A pair of leaf springs 114 are mounted by screws 116 to the outer circumferential surface 118 of disk 112. Disk 112 is mounted for rotation within an outer housing 120 having an extending plunger 122 for tripping a bleed valve 124. Bleed valve 124 is connected to a diaphragm operated control valve 70 through line 128 to the diaphragm chamber 126. Gas is supplied to the diaphragm chamber 126 from gas supply 129. As shown in FIG. 8 with shaft 24 rotating at an excessive rotational speed, leaf springs 114 extend outwardly by centrifugal force and contact plunger 122 to trip bleed valve 124. Bleed valve 124 exhausts gas from diaphragm chamber 126 to atmosphere through line 132. Valve member 71 in line 16 then moves to closed position to block the flow of high pressure glycol to motor M through line 16 to stop motor M and pump P. Upon correction of the glycol supply to pump P, valve 124 may be manually reset by lever 133 to supply gas from gas supply 129 to diaphragm chamber 126 for opening valve member 71 to permit operation of motor M.

While a glycol dehydrator system has been illustrated, the present invention may be utilized for removing desirable or undesirable elements from other gas mixtures such as in amine type sour gas treaters, for example. Amine treaters are used to remove hydrogen sulfide and carbon dioxide from natural gas and the circulating fluid or solvent may be an alkanolamine diluted with water. An amine unit is positioned upstream from the contactor or dehydrator and natural gas from a separator flows into a contactor with lean alkanolamines flowing into the upper end of the contactor and rich solvent being discharged from the bottom of the contactor for flow to a reboiler or regenerator for conversion into a lean solvent.

From the above, it is apparent that the present invention is provided to eliminate the use of "free" natural gas for driving pump P and preferably utilizes a fluid motor which has a volumetric displacement substantially equal to or less than the volumetric displacement of fluid pump P. The liquid glycol normally has a certain amount of dissolved natural gas therein including some water vapor but the "free" gas is separated from the glycol and does not penetrate the inner structure of the glycol.

Although the method and apparatus of the present invention have been described in connection with several embodiments, it is not intended to be limited to the specific form set forth herein, but on the contrary, it is intended to cover such alternatives, modifications, and equivalents, as can be reasonable included within the spirit and scope of the invention as defined by the appended claims.

What is claimed is:

1. In a glycol gas dehydrator comprising a contacting vessel having a gas inlet, a gas outlet, a dry glycol inlet, a wet glycol outlet, and means within said vessel for providing contact between the gas and the glycol flowing therethrough, a glycol regenerator, a first line communicating between the wet glycol outlet and the glycol regenerator, a second line communicating between the regenerator and the dry glycol inlet, a rotary fluid motor in said first line, a rotary pump in said second line, a rotary drive shaft extending between said rotary motor and said rotary pump, whereby glycol from said contacting vessel provides a portion of the power to drive said pump to pump dry glycol into said contacting vessel; the improvement comprising:

auxiliary drive means operably connected to said rotary drive shaft for rotation thereof to supplement the power provided by said wet glycol from said contacting vessel.

2. The invention of claim 1, wherein said auxiliary drive means is an electric motor.

3. The invention of claim 1, wherein said auxiliary drive means is a gas motor.

4. The invention of claim 1, wherein said auxiliary drive means is a second motor operated by fluid from said contacting vessel.

5. The invention of claim 4, wherein said auxiliary drive means includes a throttle to control the flow of fluid from said contacting vessel. electric motor.

6. The invention of claim 1, wherein said auxiliary drive means is an internal combustion engine with an adjustable speed control.

7. The invention of claim 6 including means connecting said internal combustion engine to a source of dry fuel gas.

8. In a glycol gas dehydrator including a contacting vessel having a gas inlet to receive a wet natural gas, a gas outlet for the discharge of dry natural gas, a dry glycol inlet to receive high pressure dry glycol, a wet glycol outlet for the discharge of high pressure wet glycol, and means within said contacting vessel for providing contact between the wet natural gas and the glycol flowing therethrough;

a glycol regenerator;

a first line in fluid communication between said wet glycol outlet and said glycol regenerator;

a second line in fluid communication between said regenerator and said dry glycol inlet;

a fluid pump in said second line to receive from said regenerator substantially the entire output of low pressure dry glycol from said regenerator for pumping to said contacting vessel;

a fluid driven motor in said first line driven by high pressure wet glycol from said contacting vessel;

a rotary shaft connecting said pump to said fluid motor for providing a portion of the power to drive said pump for pumping substantially the entire output of low pressure glycol from said regenerator to said contacting vessel; and auxiliary drive means independent of said glycol operably connected to said rotary shaft for supplementing the power provided to said pump by said high pressure wet glycol and said fluid driven motor.

9. In a glycol gas dehydrator as set forth in claim 8 wherein said rotary shaft is a single drive shaft common to said pump and said motor.

10. In a glycol gas dehydrator as set forth in claim 9 wherein said fluid motor is a rotary gear motor and said pump is a rotary gear pump.

11. In a glycol gas dehydrator as set forth in claim 10 wherein said auxiliary drive means comprises an electric motor, and said drive shaft comprises a drive shaft common to said pump, said fluid motor and said electric motor.

12. In a system for removing a predetermined component of a gas with a liquid absorber;
a contacting vessel (T) in which the liquid absorber is in intimate contact with the gas to remove the predetermined component therefrom;
a treating vessel (R) to receive the liquid absorber with the predetermined component therein for removal of the predetermined component from the liquid absorber;
a first fluid conduit (16, 20) from the contacting vessel (CT) to the treating vessel (R) to convey the liquid absorber with the component therein from the contacting vessel to the treating vessel;
a second fluid conduit (18, 15) from the treating vessel (R) to the contacting vessel (T) to convey the liquid absorber without the predetermined component therein from the treating vessel (R) to the contacting vessel (T) thereby to provide a regenerated liquid absorber to said contacting vessel;
a rotary fluid motor (M) in said first conduit driven by high pressure liquid absorber from said contacting vessel;
a rotary fluid pump (P) in said second conduit to receive from said treating vessel (T) substantially the entire output of low pressure liquid absorber from said treating vessel for pumping to said contacting vessel;
a rotary shaft (24) connecting said fluid pump (P) to said fluid motor (M) for providing a portion of the power to drive said pump for pumping substantially the entire output of low pressure liquid absorber from said treating vessel (R) to said contacting vessel (T); and
auxiliary drive means (E-1) independent of said liquid absorber operably connected to said pump to provide power to drive said pump supplementing the power provided by said fluid motor.

13. In a system as set forth in claim 12:
a drive shaft extending between said fluid motor and said pump for rotation of said pump in driving relation, said auxiliary drive means being operably connected to said drive shaft for providing a portion of the power for rotating said drive shaft.

14. In a system as set forth in claim 13 wherein said motor is a rotary gear motor and said pump is a rotary gear pump.

15. In a system as set forth in claim 14 wherein said auxiliary drive means comprises an electric motor, and said drive shaft comprises a drive shaft common to said pump, said fluid motor and said electric motor.

16. In a system as set forth in claim 12 wherein:
means (45, T1) are provided to stop said fluid motor (M) in the event the liquid absorber is not supplied to said pump (P) for a predetermined period of time.

17. In a system as set forth in claim 12 wherein:
a heat exchanger (23) is provided adjacent said treating vessel (R) for said first fluid conduit and said second fluid conduit;
the liquid absorber in said first fluid conduit being heated by said heat exchanger and the liquid absorber in said second fluid conduit being cooled by said heat exchanger.

18. In a system as set forth in claim 12 wherein:
means (110, 126, 71) are provided to stop said fluid motor (M) in the event the rotational speed of said motor exceeds a predetermined maximum thereby to protect said pump.

19. In a system as set forth in claim 18 wherein:
said means comprises a pilot operated valve (126, 71) in said first fluid conduit upstream of said motor movable between open and closed position, said pilot operated valve being actuated for movement to a closed position in said first fluid conduit upon the reaching of said predetermined maximum rotational speed thereby to block fluid flow to said fluid motor.

20. In a system as set forth in claim 12 wherein said liquid absorber comprises glycol and said treating vessel heats the glycol to a predetermined high temperature; and
a glycol bypass line (49, 48) extends from said second conduit downstream of said pump to permit the circulation of glycol back to said pump while bypassing said contacting vessel (T), said glycol being circulated through said bypass line (49, 48) during start up of the system.

21. In a system as set forth in claim 20 wherein a glycol measuring device (42) is provided in said bypass line to permit measurement of the flow rate of glycol; and
valve means (51, 54) is positioned in said bypass line (49, 48) to control the flow of glycol through said bypass line from said second conduit (15) downstream of said pump (P).

22. In a system as set forth in claim 12 wherein:
a normally closed valve (70) having a solenoid (74) for operation thereof is positioned within said first conduit (16) upstream of said fluid motor (M) and movable to open position upon energizing of said solenoid (74) to permit operation of said fluid motor, said normally closed valve moving to a closed position blocking the flow of liquid absorber to said fluid motor from said contacting vessel upon deenergizing of said solenoid to stop operation of said fluid motor.

23. In a system as set forth in claim 12 wherein:
a bypass conduit (49, 48) is connected to said second conduit downstream of said pump to permit circulation of glycol through said pump during start up of the system while bypassing said contacting vessel.

24. In a system as set forth in claim 12 wherein:
a measuring container (41) is in fluid communication with said second fluid conduit (18, 15) upstream of said pump (P) and selectively supplied with glycol from said second fluid conduit (18, 15) for filling said container (41), and means (43, 44) for emptying said container (41) for measuring the flow rate of glycol to said pump (P).

25. In a system as set forth in claim 24 wherein:
manual valve means (43) in said second fluid conduit upstream of said pump permit selectively the supply of glycol from said measuring container (41).

26. In a system for removing a predetermined component of a gas with a liquid absorber;

a contacting vessel (T) in which the liquid absorber is in intimate contact with the gas to remove the predetermined component therefrom;

a treating vessel (R) to receive the liquid absorber with the predetermined component therein for removal of the predetermined component from the liquid absorber, said treating vessel heating the liquid absorber to a relatively high temperature over around 380 F. to provide a regenerated liquid absorber;

a first fluid conduit (16, 20) from the contacting vessel (T) to the treating vessel (R) to convey the liquid absorber with the component therein from the contacting vessel to the treating vessel;

a second fluid conduit (18, 15) from the treating vessel (R) to the contacting vessel (T) to convey the liquid absorber without the predetermined component therein from the treating vessel (R) to the contacting vessel (T) thereby to provide a regenerated liquid absorber to said contacting vessel;

a fluid motor (M) in said first conduit driven by high pressure liquid absorber from said contacting vessel;

a pump (P) in said second conduit to receive from said treating vessel (R) the entire output of low pressure liquid absorber from said treating vessel for pumping to said contacting vessel;

means (24) connecting said pump (P) to said fluid motor (M) for providing power to drive said pump for pumping low pressure liquid absorber from said treating vessel (R) to said contacting vessel (T);

a bypass conduit (49, 48) downstream of said pump (P) to permit circulation of said regenerated liquid absorber through said pump during start up while bypassing said contacting vessel;

a separate container (41) of liquid absorber in fluid communication with said second fluid conduit (15, 18) and in fluid communication with said bypass conduit (49,48) to permit said container to be supplied with liquid absorber from said second fluid conduit (15) and said bypass conduit (49, 48); and valve means (51) for said bypass conduit (49, 48) to control the flow of liquid absorber through said bypass conduit, said valve means (51) opening automatically upon start up of the system to permit circulation of said regenerated liquid absorber through said bypass conduit and closing automatically upon normal operation of the systems after start up to block circulation of said regenerated liquid absorber through said bypass conduit.

27. In a system as set forth in claim 26 wherein:

additional valve means (43, 44) are provided to selectively permit the supply of said container (41) with liquid absorber from said second fluid conduit (18) and bypass conduit upstream of said pump (P).

28. In a system as set forth in claim 27 wherein:

manual valve means (43,44) permits selectively the flow of liquid absorber from said container (41) into said second fluid conduit (18) for measuring the flow rate of liquid absorber to said pump-(P).

29. In a system as set forth in claim 26 wherein:

means (110, 124, 126) are provided to stop said fluid motor (M) in the event the rotational speed of said motor exceeds a predetermined maximum thereby to protect said pump.

30. In a system as set forth in claim 29 wherein:

said means comprises a diaphragm operated valve (70, 71) in said first fluid conduit upstream of said motor movable between open and closed position, said diaphragm operated valve being actuated for movement to a closed position in said first fluid conduit upon the reaching of said predetermined maximum rotational speed thereby to block flow of said liquid absorber to said fluid motor.

31. In a system for removing a predetermined component of a gas with a liquid absorber;

a contacting vessel (T) in which the liquid absorber is in intimate contact with the gas to remove the predetermined component therefrom;

a treating vessel (R) to receive the liquid absorber with the predetermined component therein for removal of the predetermined component from the liquid absorber, said treating vessel heating the liquid absorber to a relatively high temperature to provide a regenerated liquid absorber;

a first fluid conduit (16, 20) from the contacting vessel (T) to the treating vessel (R) to convey the liquid absorber with the component therein from the contacting vessel to the treating vessel;

a second fluid conduit (18, 15) from the treating vessel (R) to the contacting vessel (T) to convey the liquid absorber without the predetermined component therein from the treating vessel (R) to the contacting vessel (T) thereby to provide a regenerated liquid absorber to said contacting vessel;

a fluid motor (M) in said first conduit driven by high pressure liquid absorber from said contacting vessel;

a pump (P) in said second conduit to receive from said treating vessel (R) the low pressure liquid absorber from said treating vessel for pumping to said contacting vessel;

means (24) connecting said pump (P) to said fluid motor (M) for providing power to drive said pump for pumping low pressure liquid absorber from said treating vessel (R) to said contacting vessel (T);

a normally closed flow member (45) in said second fluid conduit (18, 15) responsive to fluid flow in said second fluid conduit and maintained in an open position upon flow of liquid absorber to said pump above a predetermined minimum amount; and means operatively connected to said motor and responsive to said normally closed flow member (45) to stop said motor (M) when said normally closed flow member (45) is closed.

32. In a system as set forth in claim 31 wherein:

a separate measuring container (41) for liquid absorber is in fluid communication with said second fluid conduit (15, 18); and said normally closed flow member (45) is positioned in said second fluid conduit (18) between said container (44) and said pump (P)

33. In a system for removing a predetermined component of a gas with a liquid absorber;

a contacting vessel (T) in which the liquid absorber is in intimate contact with the gas to remove the predetermined component therefrom;

a treating vessel (R) to receive the liquid absorber with the predetermined component therein for removal of the predetermined component from the liquid absorber, said treating vessel heating the liquid absorber to a temperature adequate to provide a regenerated liquid absorber;

a first fluid conduit (16, 20) from the contacting vessel (T) to the treating vessel (R) to convey the liquid absorber with the component therein from the contacting vessel to the treating vessel;

a second fluid conduit (18, 15) from the treating vessel (R) to the contacting vessel (T) to convey the liquid absorber without the predetermined component therein from the treating vessel (R) to the contacting vessel (T) thereby to provide a regenerated liquid absorber to said contacting vessel;

a fluid motor (M) in said first conduit driven by high pressure liquid absorber from said contacting vessel;

a pump (P) in said second conduit to receive from said treating vessel (R) low pressure liquid absorber from said treating vessel for pumping to said contacting vessel;

means (24) connecting said pump (P) to said fluid motor (M) for providing power to drive said pump for pumping low pressure liquid absorber from said treating vessel (R) to said contacting vessel (T); and stop means (110, 124, 126) to stop said fluid motor (M) in the event the rotational speed of said motor exceeds a predetermined maximum thereby to protect said pump;

said stop means comprising a diaphragm operated valve (70, 71) in said first fluid conduit upstream of said motor (M) movable between Open and closed position, said diaphragm operated valve being actuated for movement to a closed position in said first fluid conduit upon the reaching of said predetermined maximum rotational speed thereby to block flow of said liquid absorber to said fluid motor.

34. In a system for removing a predetermined component of a gas with a liquid absorber;

a contacting vessel (T) in which the liquid absorber is in intimate contact with the gas to remove the predetermined component therefrom;

a treating vessel (R) to receive the liquid absorber with the predetermined component therein for removal of the predetermined component from the liquid absorber, said treating vessel heating the liquid absorber to a temperature adequate to provide a regenerated liquid absorber;

a first fluid conduit (16, 20) from the contacting vessel (T) to the treating vessel (R) to convey the liquid absorber with the component therein from the contacting vessel to the treating vessel;

a second fluid conduit (18, 15) from the treating vessel (R) to the contacting vessel (T) to convey the liquid absorber without the predetermined component therein from the treating vessel (R) to the contacting vessel (T) thereby to provide a regenerated liquid absorber to said contacting vessel;

a fluid motor (M) in said first conduit driven by high pressure liquid absorber from said contacting vessel;

a pump (P) in said second conduit to receive from said treating vessel (R) low pressure liquid absorber from said treating vessel for pumping to said contacting vessel;

means (24) connecting said pump (P) to said fluid motor (M) for providing power to drive said pump for pumping low pressure liquid absorber from said treating vessel (R) to said contacting vessel (T);

means (100, 102) to monitor the temperature differential between hot liquid absorber in said second fluid conduit and the temperature of said pump (P); and stop means responsive to said temperature differential when said temperature differential exceeds a predetermined amount to stop operation of said motor (M) and said pump (P).

35. In a system as set forth in claim 34:

said means to monitor the temperature differential comprises a thermocouple (100) for said hot liquid absorber and a thermocouple (102) for said pump (P).

36. In a system as set forth in claim 35:

an electric motor to supplement the power supplied by said fluid motor (P); and said stop means including an electrically actuated solenoid for energizing and deenergizing said electric motor (E-1).

37. In a system as set forth in claim 36 wherein the volumetric displacement of said fluid motor (M) is substantially equal to the volumetric of said pump (P); and the deenergizing of said electric motor (E-1) effects the stopping of said fluid motor (M).

38. A power unit for a glycol gas dehydrator system in which water and water vapor are removed from natural gas, the power unit operable for positioning in fluid conduits between a contacting vessel and a glycol regenerator; said power unit comprising:

a fluid motor for positioning in one of said fluid conduits to receive high pressure wet glycol from said contacting vessel and to convey low pressure wet glycol to said glycol regenerator;

a pump for positioning in another of said fluid conduits to receive substantially the entire output of low pressure dry glycol from said regenerator for pumping to said contacting vessel;

rotatable drive shaft means connecting said fluid motor to said pump for providing a portion of the power to drive said pump for pumping substantially the entire output of low pressure dry glycol from said regenerator to said contacting vessel; and auxiliary drive means not responsive to said glycol operably connected to said rotatable drive shaft means for said pump to provide power to drive said pump for supplementing the power provided by said fluid driven motor.

39. A power unit as set forth in claim 38 wherein said rotatable drive shaft means includes a drive shaft extending between said motor and said pump for rotation of said pump in driving relation, and said auxiliary drive means is operably connected to said drive shaft for providing a portion of the power for rotating said drive shaft.

40. A power unit as set forth in claim 39 wherein said auxiliary drive means comprises an electric motor, and said drive shaft comprising a single drive shaft common to said pump, said fluid motor, and said electric motor.

41. A method of removing a predetermined component of a gas under pressure with a liquid absorber, comprising the following steps:

circulating the liquid absorber through a contacting vessel for intimate contact with the gas therein so that the liquid absorber absorbs said predetermined gas component;

providing a first fluid conduit between the contacting vessel and a treating vessel for conveying the liquid absorber and gas component to said treating vessel for removal of the gas component from the liquid absorber to provide a regenerated liquid absorber;

providing a rotary fluid motor in said first fluid conduit driven by said liquid absorber;

providing a second fluid conduit between said treating vessel and said contacting vessel for return of the regenerated liquid absorber to said contacting vessel;

pumping from a rotary pump in said second fluid conduit substantially the entire output of said regenerated liquid absorber from said treating vessel to said contacting vessel;

connecting said fluid motor to said rotary pump for providing a portion of the power to drive said rotary pump;

connecting an auxiliary drive means to said rotary pump independent of said liquid absorber to provide a portion of the power to drive said pump to supplement the power provided by said fluid motor and high pressure liquid absorber from said contacting vessel;

providing a rotary shaft for said rotary fluid motor and said rotary pump; and driving said rotary pump from said rotary shaft.

42. A method of removing a predetermined component of a gas as set forth in claim 41 including the steps of:

providing means for stopping said fluid motor which are actuated when the flow of regenerated liquid absorber to said pump from said treating vessel reaches a predetermined minimum; and stopping said fluid motor upon the actuation of said stopping means.

43. A method of removing a predetermined component of a gas as set forth in claim 41 including the steps of:

providing means for stopping said fluid motor which are actuated when the rotational speed of said fluid motor exceeds a predetermined maximum rotational speed; and stopping said fluid motor upon actuation of said stopping means.

44. A method of removing a predetermined component of a gas as set forth in claim 41 includes the step of:

providing a bypass fluid conduit for said second fluid conduit downstream of said pump to permit the circulation of liquid absorber through the pump while bypassing said contacting vessel; and circulating liquid absorber to said pump through said bypass conduit during a start up operation for bypassing said contacting vessel.

45. A method of removing a predetermined component of a gas as set forth in claim 44 including the steps of:

providing a measuring container in said second conduit upstream of said pump for receiving a predetermined amount of liquid absorber selectively from said second conduit; and emptying said liquid absorber from said measuring container into said second conduit to determine the flow rate of liquid absorber to said pump.

46. A method of removing a predetermined component of a gas under pressure with a liquid absorber, comprising the following steps:

circulating the liquid absorber through a contacting vessel for intimate contact with the gas therein so that the liquid absorber absorbs said predetermined gas component;

providing a first fluid conduit between the contacting vessel and a treating vessel for conveying the liquid absorber and gas component to said treating vessel for removal of the gas component from the liquid absorber to provide a regenerated liquid absorber;

providing a fluid motor in said first fluid conduit driven by said liquid absorber;

providing a second fluid conduit between said treating vessel and said contacting vessel for return of the regenerated liquid absorber to said contacting vessel;

providing a fluid pump in said second fluid conduit and pumping said regenerated liquid absorber from said treating vessel to said contacting vessel through said second fluid conduit;

connecting said fluid motor to said pump to drive said pump;

providing a bypass fluid conduit for said second fluid conduit downstream of said pump to permit the circulation of liquid absorber in said second fluid conduit through the pump while bypassing said contacting vessel;

circulating liquid absorber from said pump through said bypass conduit during a start up operation for bypassing said contacting vessel; and providing fluid control means for said bypass fluid conduit to permit the flow of liquid absorber through said bypass fluid conduit during start up operation and to block flow of liquid absorber through said bypass fluid conduit during normal operation.

47. A method of removing a predetermined component of a gas as set forth in claim 46 including the steps of:

providing a measuring container in fluid communication with said second fluid conduit and in fluid communication with said bypass conduit; and selectively permitting the flow of liquid absorber from said second fluid conduit to said bypass conduit and said measuring container for the start up operation.

48. A method of removing a predetermined component of a gas as set forth in claim 47 including the step of:

bleeding air from said bypass conduit through said measuring container to permit air in said bypass conduit and pump to exhaust to atmosphere for initially priming said pump.

* * * * *